W. A. BERGER.
MINING TRANSIT CENTER FINDER.
APPLICATION FILED SEPT. 26, 1908.
944,654.
Patented Dec. 28, 1909.
2 SHEETS—SHEET 2.
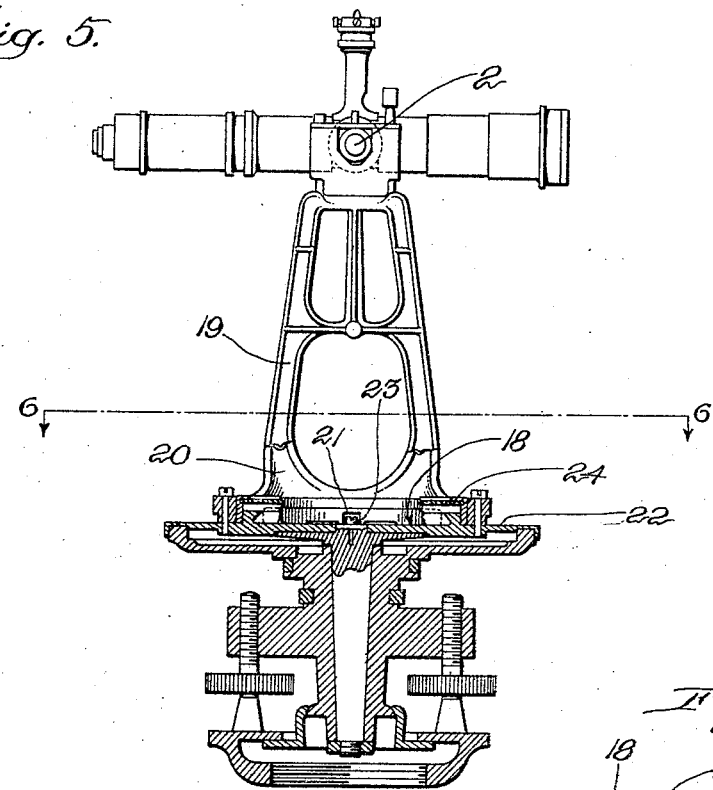
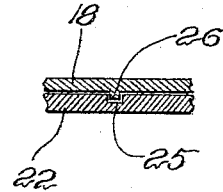
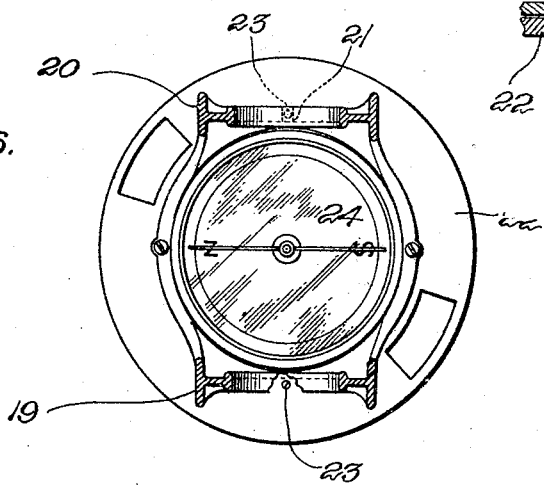
Witnesses:
Edward Maxwell.
H. C. Bruser.
Inventor:
William A. Berger,
by Geo. H. Maxwell
Atty.

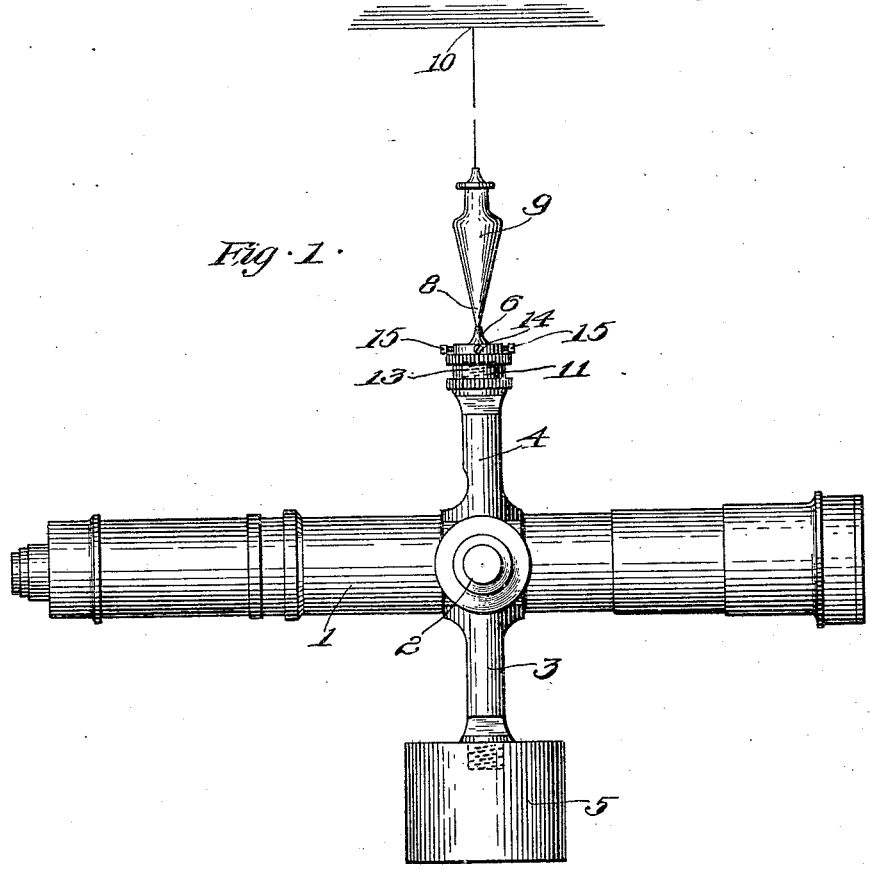
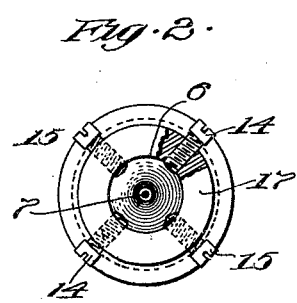
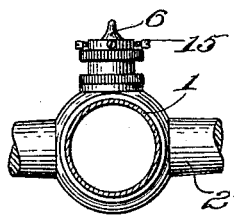
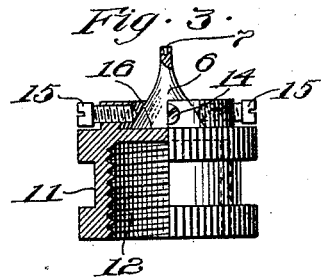

UNITED STATES PATENT OFFICE.

WILLIAM A. BERGER, OF BOSTON, MASSACHUSETTS.

MINING-TRANSIT-CENTER FINDER.

944,654.  Specification of Letters Patent. Patented Dec. 28, 1909.

Application filed September 26, 1908. Serial No. 454,917.

*To all whom it may concern:*

Be it known that I, WILLIAM A. BERGER, a citizen of the United States, residing at Boston, in the county of Suffolk and State of Massachusetts, have invented an Improvement in Mining-Transit-Center Finders, of which the following description, in connection with the accompanying drawings, is a specification, like numerals on the drawings representing like parts.

My invention is a device for enabling the mine surveyor to locate the center of his instrument more readily than heretofore with relation to an overhead object; and with this end in view, my invention consists in providing means at the intersecting point of the line of collimation and of the transverse axis for coöperating with a plumb bob or the like suspended from overhead, whereby the surveyor can determine quickly and accurately the desired center.

My invention also includes means coöperating with said center-determining means to permit the telescope and its standards to be centered accurately with relation to the base of the instrument, so that, in an ordinary transit, the line of collimation will come directly in line with the north and south points of the compass, my invention rendering certain that the reading of the instrument will be correct as to horizontal angles irrespective of such lateral adjustments of the telescope as may be necessary in order to cause the meeting point of the line of collimation and the transverse axis to aline with the center of the instrument.

While my invention may be embodied in a a large variety of ways, I have herein shown a preferred embodiment in the accompanying drawings, in which—

Figure 1 shows a portion of an instrument in side elevation provided with my invention, said figure illustrating the manner of using the same with reference to an overhead plumb bob and line; Figs. 2 and 3 are enlarged details of one form of the centering device shown in top plan and side elevation respectively, parts being broken away in sections for clearness of illustration; Fig. 4 is a transverse sectional view of a telescope provided with my centering device located closer to the telescope than in Fig. 1; Fig. 5 is a view in side elevation, partly broken away, of the lower portion in central vertical section, showing the complete embodiment of my invention; Fig. 6 is a horizontal sectional view taken substantially on the line 6—6, Fig. 5, parts being further broken away; and Fig. 7 is a fragmentary sectional view showing a modification.

It will be understood that my invention is applicable to any and all kinds of instruments of the nature of mining transits. For convenience of illustration, I have shown it in Fig. 1 in connection with a telescope of the kind shown in U. S. Patent No. 559,117, granted to Christian L. Berger, April 28, 1896, and in Fig. 4 in connection with an ordinary main telescope mining transit.

The first feature of my invention to which I will refer consists, stated in general terms, of providing the transit with means for locating the centering point in such a manner that it may be referred to conveniently in connection with a plumb line or any other point-determining device.

Referring to Fig. 1, I have shown a usual main telescope 1 and its transverse bearing axis 2 at whose intersection are usual opposite posts 3, 4 for receiving respectively a counter-balance weight 5 and an auxiliary telescope (not shown). On the post 4 I provide a center finder 6 which is herein shown as having a tapering or conical base, see Fig. 3, and is removably mounted on the telescope, although I do not wish to restrict my invention in any of these respects. The finder 6 preferably has a sharp cone, preferably provided with a small cavity or recess 7 at its upper end which indicates the exact vertical center line of the instrument, so that if the point 8 of a plumb bob 9 suspended from the reference point 10 in the ceiling were lowered, it would exactly enter this open-pointed end or recess 7 of the instrument when correctly placed. For convenience, the center finder is made removable, having a hub 11 internally threaded at 12 to fit the externally threaded boss or end 13 of the post 4. Suitable shifting means is provided for bringing the point 7 into exactly correct position in alinement with the vertical center line of the instrument, said means being herein shown as consisting of opposite pairs of screws 14, 15, whose beveled inner ends bear against the inclined base of the center finder, thereby holding the same tightly down upon the flat bottom 16 of the hub. The screws pass through an upwardly projecting flange 17 which serves the double purpose of retaining the screws and protecting the finder. In Fig. 4 I have shown the same construction excepting that it is mounted close down upon the telescope.

The center finder will scarcely ever need adjustment in the field, being accurately adjusted when the instrument is first sent out, and thereafter only when the telescope or its adjustment with relation to the vertical center become deranged by an accident, or from any other cause either the line of collimation or the transverse axis become altered. The manner of using this part of my invention in the field will be obvious to those skilled in the art and it will at once be appreciated that thereby the mine surveyor is enabled to center his instrument much more readily and accurately than heretofore, under an overhanging plumb bob and line or the like. Also by having the center finder stand up sufficiently so as to be visible as a point above the instrument, it may be conveniently used in sighting with relation to the plumb bob and the centering device or for general sighting purposes.

I will now describe my entire invention, with relation to its principal use and advantages, which relate to factory adjustments. In the first place I wish to point out that, in mine surveying, it is of the utmost importance, in order that a true straight line may be projected from the instrument to accurately locate a distant point, that the vertical cross wire of the telescope, when adjusted for collimation, shall lie in a vertical plane which includes the vertical center of the instrument, as otherwise there would be an error of eccentricity between the vertical line of sight of the telescope (when turned on its transverse axis, for example) and the said plane containing said vertical center, this error becoming increasingly obvious the greater the distance, and the error is still more serious when there is an angular variation between the line of collimation and the north and south points of the compass. Accordingly I have provided means for insuring that the lateral adjustment of the telescope (which in the preferred embodiment of my invention includes the lateral adjustment of the standards) must invariably be at right angles to the line which includes the north and south points of the compass, so that, thereafter, the proper adjustment of the center finder 6 cannot introduce any angular error. Accordingly I provide the bottom 18 of the standard frame or opposite standards 19, 20 with a groove or slot or other guiding means, herein shown as a rectangular slot 21 truly parallel with the transverse axis 2 of the telescope, and on the base plate or vernier plate 22 of the instrument I provide two projecting studs or guides 23 one at each side thereof.

I wish it understood that I do not restrict myself to any specific form of guiding means, but only to the requirement that said guiding means shall cause a movement parallel to the transverse axis of the telescope and at right angles to the line which includes the north and south points of the compass 24 of the instrument, said points being indicated in Fig. 6 by the usual letters N., S. For instance in Fig. 7 I have shown the vernier plate as provided with a groove 25 and the standard frame as having a stud 26 to move in said groove, this being a reversal of the preferred construction as shown in Figs. 5 and 6. Thus, when the instrument is adjusted for collimation it is impossible for the standard frame, and hence for the telescope, to be rotated in the slightest with reference to the vernier plate, and therefore the danger of angular variation between the line of collimation of the telescope and the north and south line of the compass is entirely eliminated. The direction of adjustment is absolutely controlled by the coöperating guideway and guide 21, 23, so that said direction must necessarily be at right angles to the north and south line of the compass. Hence, when the center point or apex of the center finder 6 is adjusted it is brought very readily to the true center of the instrument without any danger of introducing any angular variation such as I have previously described.

While I have referred the base plate adjustment to the compass, I wish it understood that my invention has advantages when used with instruments not having any compass, in which case the guides and guideways are simply so located as invariably to maintain the transverse axis of the telescope in the vertical plane which includes the center of the instrument. This insures that the transverse axis of the telescope, however the latter may be adjusted, will always be truly vertical over the center of the instrument, and hence the only adjustment necessary for causing the line of collimation to coincide with said center is simply the straight line lateral adjustment which is controlled by my guide and guideway construction.

As already intimated, I do not intend to restrict my invention to the constructional details herein shown, as many changes and substitutions may be resorted to without departing from the spirit and scope of the invention.

Having described my invention, what I claim as new and desire to secure by Letters Patent is:

1. The combination with a surveying instrument and its telescope, of a centering device, normally fixed with reference to said telescope, having a center-point indicating means for indicating the position of the center of the instrument with reference to the point of a plumb-bob.

2. The combination with a surveying instrument, of a centering device having a center-point recess capable of receiving the point of a suspended plumb bob or the like for determining the proper position of the instrument.

3. In a surveying instrument, a telescope, a center-determining device normally fixed with reference to said telescope, having a projecting point located in vertical alinement with the intersecting point of the optical axis of said telescope and the transverse pivotal axis of said telescope.

4. The combination with a surveying instrument and its telescope, of a centering device, normally fixed with reference to said telescope, having means for indicating to the touch and to the sight the center point of the instrument with reference to the point of a plumb-bob.

5. In a surveying instrument, a telescope, supporting means therefor having a vertical pivot to permit said telescope to move in a horizontal plane, and a center-finder having normal fixed relation with reference to the adjacent portion of the instrument and provided with a center point, distinguishable by touch, for indicating to the operator the position of the vertical center of the instrument with reference to a plumb-bob.

6. The combination with a surveying instrument and its telescope, of a removable centering device, normally fixed with reference to said telescope, having a center-point indicating means for indicating the position of the center of the instrument with reference to the point of a plumb-bob.

7. In a surveying instrument, a telescope provided with a center finder having adjusting means for bringing it into accurate alinement with the intersection of the line of collimation and the transverse axis of the telescope.

8. A centering device for a surveying instrument comprising a center finder, supporting means therefor, and lateral adjusting means for laterally shifting said center finder.

9. A centering device for a surveying instrument comprising a center finder having a conical base, supporting means therefor, and lateral adjusting means to engage the sloping walls of said conical base for laterally shifting said center finder.

10. A centering device for a surveying instrument comprising a center finder having a conical base, a hub-like support therefor, having its lower end threaded to fit an instrument, the upper side thereof having a flange surrounding said conical base, and adjusting screws mounted in said flange and bearing against said base for shifting said center finder laterally.

11. In a surveying instrument, the combination with a telescope and means for laterally adjusting said telescope in the longitudinal direction of its transverse axis, of an adjustable center finder, and means for maintaining the transverse axis of the telescope in the vertical plane of the center of the instrument, when the telescope is laterally adjusted.

12. In a surveying instrument, a horizontal vernier plate, a supporting frame adjustably mounted thereon, a telescope having its transverse axis mounted in said frame in the vertical plane which includes the center of the instrument, and guiding means for maintaining said transverse axis in said vertical plane when said frame is adjusted on said vernier plate.

13. In a surveying instrument, a vernier plate, a compass mounted thereon, a standard frame mounted on said plate and adjustable with relation to said plate and to said compass, a telescope having its horizontal axis mounted in said frame, and guiding means for guiding said frame, in its adjustment, at right angles to the north and south line of said compass.

In testimony whereof, I have signed my name to this specification, in the presence of two subscribing witnesses.

WILLIAM A. BERGER.

Witnesses:
Louis Brown,
Geo. H. Maxwell.